United States Patent Office.

LORENZO D. FERGUSON, OF DANSVILLE, NEW YORK.

Letters Patent No. 79,645, dated July 7, 1868.

IMPROVED ROOFING-COMPOUND.

*The Schedule referred to in these Letters Patent and making part of the same.*

TO ALL WHOM IT MAY CONCERN:

Be it known that I, LORENZO D. FERGUSON, of Dansville, in the county of Livingston, and State of New York, have invented certain new and useful Improvements in Compound for Roofing; and I do hereby declare that the following is a full, clear, and exact description thereof.

The following are the ingredients and proportions thereof used in the preparation of my compound for roofing, and also my manner of using the same.

One part of quicklime, one part of plumbago or black lead, one part oxide of iron, one part plaster of Paris, one part powdered sulphur, one part common sand, or pulverized slate or stone, which I mix with hot coal-tar to the consistency of common mortar, using two pounds of rosin to every barrel of tar. When this is done, the roof being covered with felt, I spread the compound above described on said roof in the ordinary manner. After this process, I then coat the roofing with a suitable quantity of oxide of iron or black-lead, over which I pass a light roller. If the roof be steep, requiring the cement or compound to harden quickly, dilute the hot tar with alkali prepared from potash or sal-soda. The quicklime uniting with the water, it will, in a few hours, become hardened, and thus prevent the tarry portion from running off the roof, thereby preventing waste. The iron or lead on the cement unites with the tar and forms a glazing, or hard, smooth surface, which will be perfectly water-proof.

What I claim, and desire to secure by Letters Patent, is—

The combination of the ingredients herein specified, when used in the manner and for the purpose set forth.

In testimony that I claim the foregoing as my own, I affix my signature in presence of two witnesses.

LORENZO D. FERGUSON.

Witnesses:
    A. M. ANDERSON,
    J. C. WHITEHEAD.